United States Patent
Miranda-Steiner et al.

(10) Patent No.: US 8,490,077 B2
(45) Date of Patent: Jul. 16, 2013

(54) RUNTIME VERSIONING AND DISTRIBUTION OF DYNAMIC WEB-ELEMENTS

(75) Inventors: Emmanuel Miranda-Steiner, Redmond, WA (US); Ryan Parsell, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 12/121,379

(22) Filed: May 15, 2008

(65) Prior Publication Data

US 2009/0288077 A1 Nov. 19, 2009

(51) Int. Cl.
*G06F 9/44* (2006.01)

(52) U.S. Cl.
USPC .......... 717/173; 717/171; 717/172; 717/177; 717/178; 709/220; 709/223

(58) Field of Classification Search
USPC .......... 717/122, 148, 168–178; 709/220–227; 707/609–686
See application file for complete search history.

(56) References Cited

U.S. PATENT DOCUMENTS

| | | | | |
|---|---|---|---|---|
| 5,581,749 A | * | 12/1996 | Hossain et al. | 1/1 |
| 5,790,848 A | * | 8/1998 | Wlaschin | 707/661 |
| 5,819,274 A | * | 10/1998 | Jackson, Jr. | 1/1 |
| 5,845,077 A | * | 12/1998 | Fawcett | 709/221 |
| 6,006,034 A | * | 12/1999 | Heath et al. | 717/170 |
| 6,009,274 A | * | 12/1999 | Fletcher et al. | 717/173 |
| 6,049,671 A | * | 4/2000 | Slivka et al. | 717/173 |
| 6,286,004 B1 | * | 9/2001 | Yoshiura et al. | 707/615 |
| 6,343,299 B1 | * | 1/2002 | Huang et al. | 707/638 |
| 6,377,957 B1 | * | 4/2002 | Jeyaraman | 707/625 |
| 6,546,554 B1 | | 4/2003 | Schmidt et al. | |
| 6,567,104 B1 | | 5/2003 | Andrew et al. | |
| 6,823,359 B1 | | 11/2004 | Heidingsfeld et al. | |
| 7,003,767 B2 | | 2/2006 | Larkin | |
| 7,062,492 B1 | | 6/2006 | Graham | |
| 7,194,682 B2 | | 3/2007 | Warrington | |
| 7,305,672 B2 | | 12/2007 | Vincent | |
| 2004/0210865 A1 | * | 10/2004 | Shimura | 717/100 |
| 2004/0215755 A1 | * | 10/2004 | O'Neill | 709/223 |
| 2005/0102611 A1 | * | 5/2005 | Chen | 715/513 |
| 2006/0173987 A1 | | 8/2006 | Friesen et al. | |
| 2007/0073730 A1 | | 3/2007 | Jun | |
| 2007/0271332 A1 | * | 11/2007 | Joshi et al. | 709/203 |
| 2008/0126653 A1 | * | 5/2008 | King et al. | 710/300 |

* cited by examiner

*Primary Examiner* — Chat Do
*Assistant Examiner* — Sergio J Curbelo, III
(74) *Attorney, Agent, or Firm* — Senniger Powers LLP

(57) ABSTRACT

A product server downloads distributed application component from a resource server and updates an application at a predetermined synchronization time. Other aspects include associating a distributed application component and a local application component with a virtual path. If a product server is unable to access the local application component with a virtual path, the distributed application component is downloaded from a resource server.

16 Claims, 3 Drawing Sheets

RUNTIME VERSIONING AND DISTRIBUTION OF DYNAMIC WEB-ELEMENTS

BACKGROUND

User interfaces (UI) are often designed to meets high standards and/or legal obligations in regards to accessibility, globalization, performance, security, geopolitical sensitivity, and browser interoperability. In addition, elements of a UI, which may include web controls and entire web pages, are required to look and behave consistently across a large number of computers of a network.

UI elements may be hosted and served centrally by a common resource server. On the other hand, UI elements may be hosted independently by each computer. And when UI elements are hosted independently by each computer, the UI elements need to be redistributed to each independent computer as updates become available.

SUMMARY

Aspects of the invention overcome one or more vulnerabilities associated with updating an application with distributed application components hosted by a resource server. A product server may download the distributed application component from the resource server and update the application within a predetermined synchronization period of time. Other aspects include associating a distributed application component and a local application component with a virtual path. If a product server is unable to access the local application component with a virtual path, the distributed application component is downloaded from a resource server.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
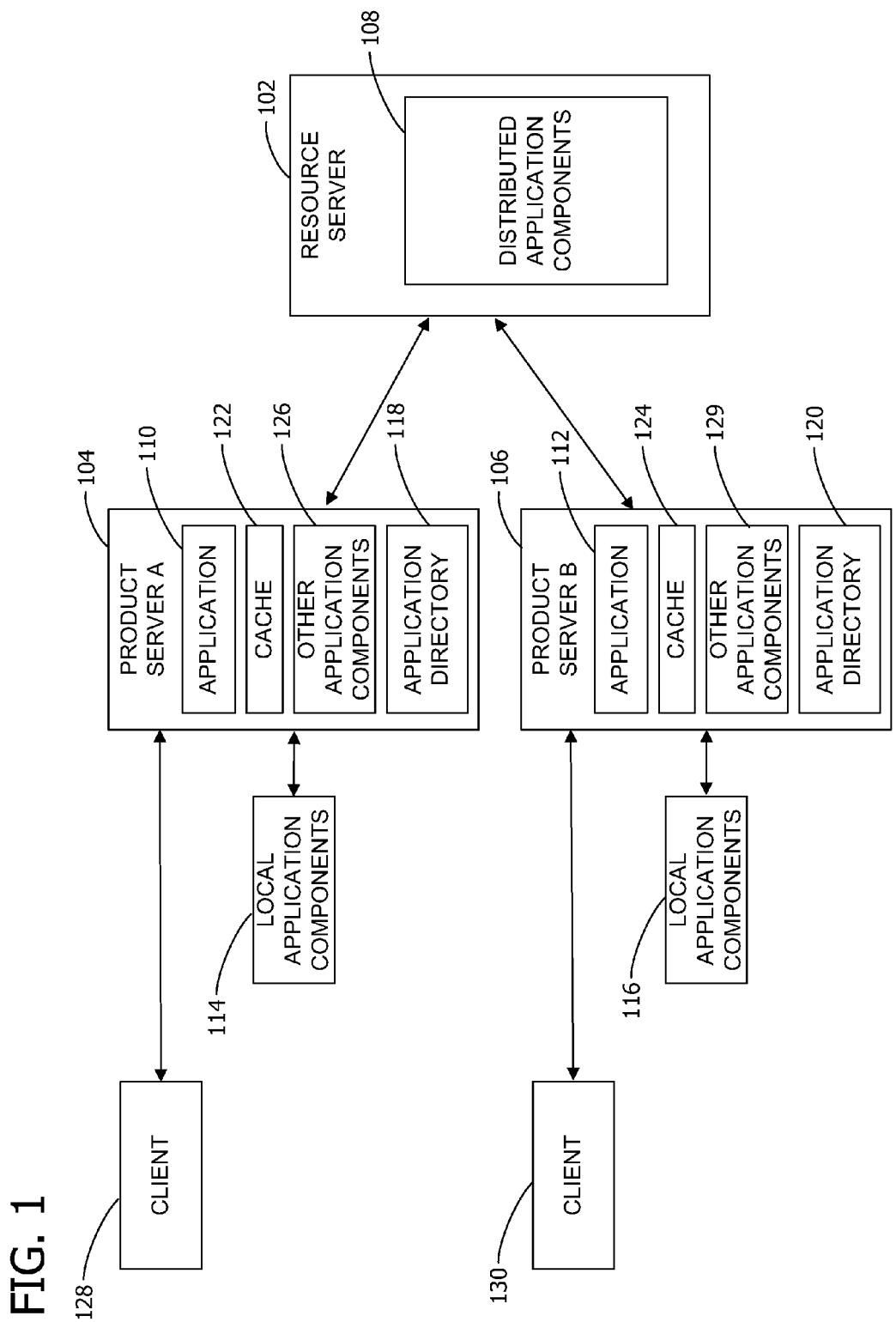
FIG. 1 is a block diagram illustrating one example of a suitable computing system environment in which the invention may be implemented.

FIG. 1 is a block diagram illustrating one example of a suitable computing system for updating an application. The system includes a resource server 102 and a plurality of product servers (e.g., product server A 104, product server 106). The resource server 102 includes a processor configured for executing computer executable instructions for storing a plurality of distributed application components 108. In an embodiment, the distributed application component 108 includes one or more of the following: data, a webform, a web control, data, a web page, a pre-compiled component and a just-in-time (JIT) component. For example, the distributed application component 108 may be associated with User Interface (UI) components of an application.

The plurality of product servers (e.g., product server A 104, product server 106) each include a processor configured for executing computer executable instructions for hosting an application (e.g., application 110, application 112) including one or more local application components (e.g., local application components 114, local application components 116), each local application component being associated with a corresponding distributed application component 108. In an embodiment, the application (e.g., application 110, application 112) associated with the product server (e.g., product server A 104, product server 106) additionally includes one or more other application components (e.g., other application component 126, other application component 129) which do not correspond to distributed application components 108 of the resource server 102.

Each of the plurality of product servers (e.g., product server A 104, product server 106) also includes instructions for downloading each corresponding distributed application component 108 from the resource server 102 and updating the application (e.g., application 110, application 112) at a predetermined synchronization time. Each product server installs each downloaded application component at the predetermined synchronization time. In an embodiment, the predetermined synchronization time occurs on a regular basis.

In an embodiment, the product servers (e.g., product server A 104, product server 106) send a version request to the resource server 102. In response to the received request, the resource server 102 generates a list of the distributed application components 108 and their corresponding distributed version numbers. The product servers each receive the generated list of distributed application components 108 from the resource server 102 and download at least one distributed application component 108 from the resource server 102 where the distributed version number does not equal the local version of the corresponding local application component (e.g., local application component 114, local application component 116). In another embodiment, the plurality of product servers each send the version request at a random or pseudo-random time within a predetermined reoccurring window of time.

For example, suppose a new distributed application component 108 becomes available and needs to be applied across all product servers (e.g., product server A 104, product server 106) utilizing the distributed application component in a synchronized fashion. Each product server (e.g., product server A 104, product server 106) makes a request to the resource server 102 for a list of available distributed application components 108 and their respective version at different time within a window of time (e.g., a random or pseudo-random point between 29 minutes and 49 minutes after each hour). The product server then downloads the new version of the distributed application component.

However, the new version of the application component is not put to use by the product server (e.g., product server A 104, product server 106) until 59 minutes after each hour (based on the system clock). Advantageously, this ensures that all product servers across the network have time to download the new distributed application component. And, to the end user, it appears that all the application's UI applied an update at exactly the same time, one minute before the hour. This is particularly advantageous in an environment when many product servers may be responding to a plurality of requests, such a large web site. Clients making requests to the web site may receive information from any one of a number of web servers in a transparent fashion (e.g., the client does not know which particular web server is responding to its request, just that the information is coming from the web site). And if the application is not updated in a synchronized manner, the user may receive inconsistent data resulting in an unsatisfactory user experience.

Referring again to FIG. 1, in another embodiment, the product server (e.g., product server A 104, product server 106) stores the downloaded distributed application component in an application directory (e.g., application directory 118, application directory 120) and deletes the corresponding local distributed application component (e.g., local application component 114, local application component 116) stored in a cache (e.g., cache 122, cache 124). The product server copies the distributed application component stored in the application directory to the cache when the application (e.g., application 110, application 112) requests the local application component.

In an embodiment, the product server (e.g., product server A 104, product server 106) compiles the local application component (e.g., local application component 114, local application component 116) in response to the application (e.g., application 110, application 112) requesting the local application component. The compiled application component is then stored in the cache (e.g., cache 122, cache 124).

Figure 2:
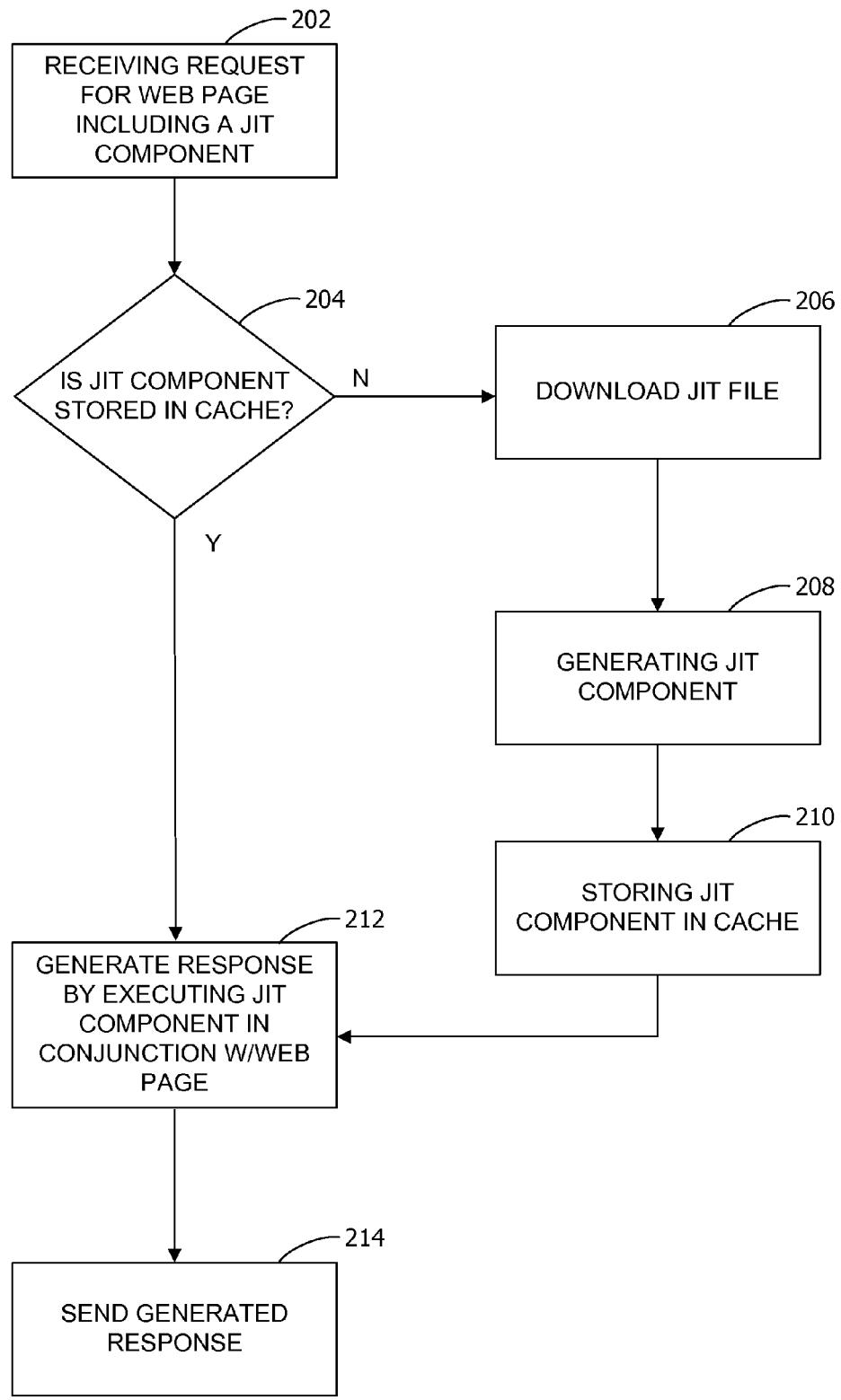
FIG. 2 is an exemplary flow diagram illustrating a method for distributing just-in-time compilation (JIT) components.

FIG. 2 is an exemplary flow diagram illustrating a method for distributing just-in-time compilation (JIT) components. At 202, the product server (e.g., product server A 104, product server 106) receives a request from a client (e.g., client 128, client 130) for a web page (e.g., application 110, application 112) including a JIT component (e.g., distributed application component 108). In an embodiment, the JIT component includes one or more of the following: a webform and a web control.

At 204, the product server determines if a compiled version of the JIT component is stored in a cache (e.g., cache 122, cache 124). If the compiled version of the JIT component is stored in a cache, the product server generates a response by executing the stored JIT component in conjunction with the requested web page at 212. And at 214, the product server sends the generated response to the client.

If the compiled version of the JIT component (e.g., distributed application component 108) is not stored in a cache (e.g., cache 122, cache 124), the product server (e.g., product server A 104, product server 106) downloads the JIT file from a resource server 104 at 206. At 208, the product server generates the JIT component by compiling the retrieved JIT file. At 210, the product server stores the JIT component in the cache. At 212, the product server generates a response by executing the stored JIT component in conjunction with the requested page in response to receiving the request. And at 214, the product server sends the generated response to the client (e.g., client 128, client 130).

For example, suppose a webform or web control (e.g., local application component 114, local application component 116) is hosted locally by the product server (e.g., product server A 104, product server 106) and the requested page is not yet cached by the application (e.g., application 110, application 112). The application retrieves the webform or web control file from the application directory (e.g., application directory 118, application directory 120) just-in-time compiles the file, and stores the resulting compiled page in the cache (e.g., cache 122, cache 124) under a "[dir]\Net\Framework\[framework version]\Temporary Files" directory.

The application (e.g., application 110, application 112) uses the path to the web form as the key into its cache (e.g., cache 122, cache 124) and searches this cache for the compiled version of the web form before looking for the uncompiled version under the application directory (e.g., application directory 118, application directory 120). When the web form is loaded any contained web controls on the page are also instantiated. The path to each control is specified in the web form and these paths are also used by the application as keys into its internal cache and used when attempting to retrieve the JIT version of the control.

In an embodiment, the JIT component stored in the cache (e.g., cache 122, cache 124) is deleted when a new version of the JIT component is available on the resource server 104. For example, the JIT component stored in the cache is deleted in response to the product server receiving a notification that a new version of the JIT component is available from the resource server. In another embodiment, the client sends a version request to the resource server 104 at a random or pseudo-random time within a predetermined reoccurring window of time to determine if a new version of the JIT component is available from the resource server 104.

And, in yet another embodiment, the JIT component in the cache is associated with a virtual file path. The virtual file path is also associated with the JIT file of the resource server 104. For example, the virtual file path may be associated with a version number of the JIT file and JIT component.

Figure 3:
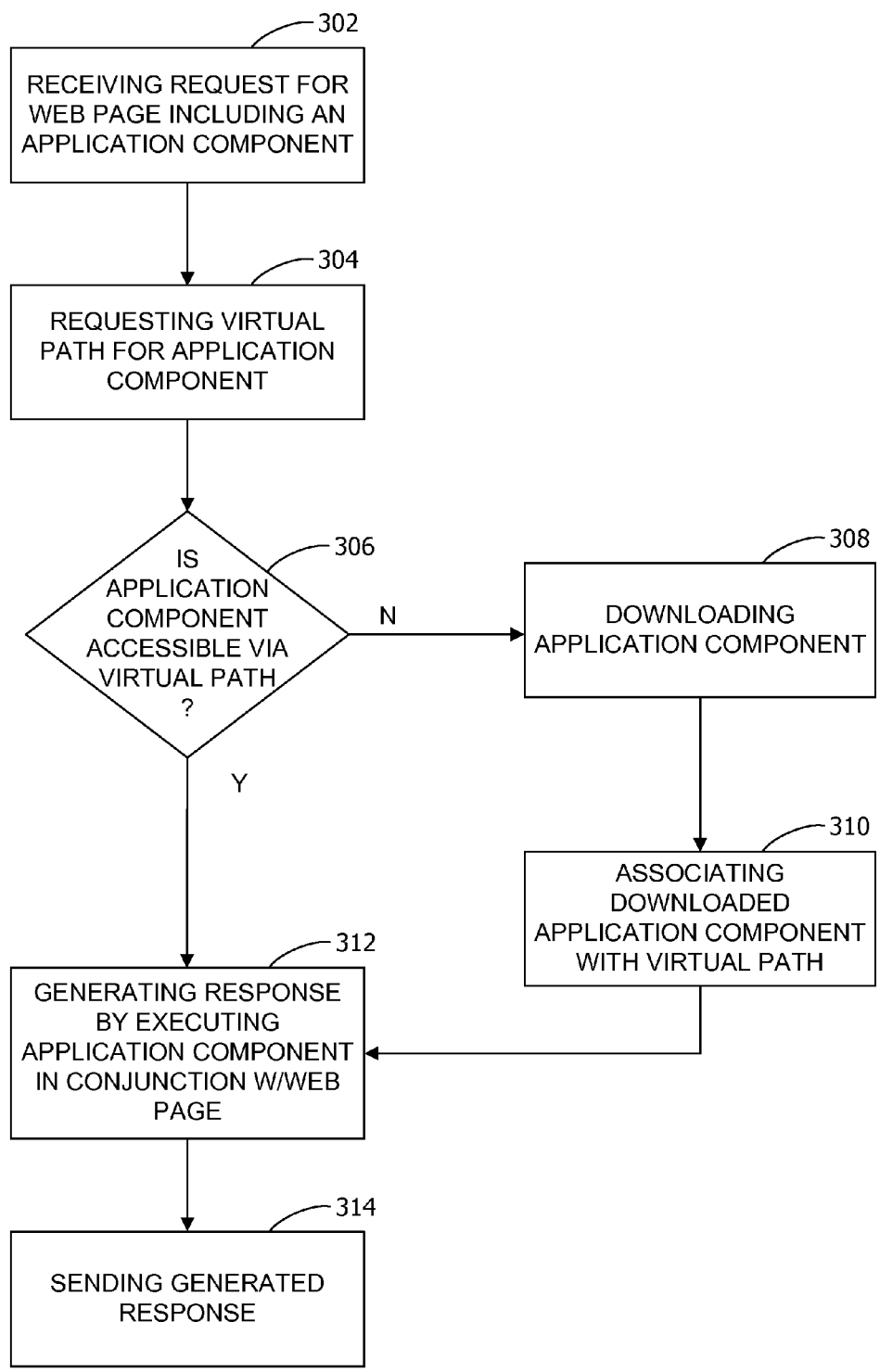
FIG. 3 is an exemplary flow diagram illustrating a method for updating an application component.

FIG. 3 is an exemplary flow diagram illustrating a method for updating an application component. At 302, the application (e.g., application 110, application 112) receives a request from a client (e.g., client 128, client 130) for a web page including the application component (e.g., local application component 114, local application component 116). In an embodiment, the application component includes one or more of the following: a webform, a web control, data, a pre-compiled component and a just-in-time (JIT) component.

At 304, the application requests a virtual path for the application component. The virtual path provides an indication of a most current version of the application component available on the resource server 104.

At 306, the application attempts to access a local application component (e.g., local application component 114, local application component 116) via the virtual path. If the attempt succeeds, the application generates a response by executing the local application component (e.g., local application component 114, local application component 116) in conjunction with the requested web page in response to receiving the request at 312. And at 314, the application sends the generated response to the client.

If the attempt at 306 fails, the application downloads the most current version of the application component 108 from a resource server 104 to a local directory (e.g., application directory 118, application directory 120) at 308. At 310, the downloaded application component stored in the local directory is associated with the virtual path. In an embodiment, the downloaded application component is compiled before it is associated with the virtual path. At 312, the application generates a response by executing the downloaded application component associated with the virtual path in conjunction with the requested web page. And at 314, the application sends the generated response to the client.

For example, the virtual path contains a token and extra sub directory. And, the distributed application component 108 being requested using the virtual path are not physically located under the under the application directory (e.g., application directory 118, application directory 120) at the virtual path being requested. The requests for distributed application component 108 are forwarded (e.g., via an HTTPS GET request) to the resource server 102. Given the virtual path, the resource server 102 will respond with the correct version of the requested distributed application component 108 back to the application (e.g., application 110, application 112) running on the product server (e.g., product server A 104, product server 106). The requested distributed application component 108 is then returned to application which then in turn compiles it and caches the result in the its cache (e.g., cache 122, cache 124). In an embodiment, the same cache used to store (e.g., local application component 114, local application component 116). Subsequent requests use the previously cached distributed application component 108 without the need to make additional calls to resource server 102.

In an embodiment, the application periodically sends a request to the resource server 104 for the most current version of the application component available on the resource server 104. The application then generates a virtual path for the application component. The virtual path provides an indication of the most current version of the application component available on the resource server and local application component is no longer associated with the generated virtual path. In another embodiment, sending of the request occurs at a random or pseudo-random time within a predetermined reoccurring window of time.

For example, product server (e.g., product server A 104, product server 106) using distributed application components 108 will also be expecting updates of data and improvements in implementation. These updates and improvements are published and made available from time-to-time on the resource server 102. The application (e.g., application 110, application 112) generates a request to the resource server 102 hourly in an operation known as the "heartbeat." In this exchange, the application receives information regarding which version of each distributed application component 108 to use based the requesting application (e.g., Social Networking application), what version of the application is making the request (e.g. Social Networking application v12.1), and any additional preferences that application specifies in a configuration file. When the product server initializes the application, the product server passes a stream of information including the name and version of the application. The application takes this information and adds the version of its own binaries and sends the information to resource server during the "heartbeat". The operation may repeat once an hour or based on some other regular schedule.

The resource server receives the information sent by the application and determines the correct version of each distributed application component 108 for the requesting application. The correct version is determined based on application preferences specified in the configuration file and by technical compatibilities between the version of the application on the product server and the distributed application components 108 available on the resource server 102. The correct versions are returned to the application and a new virtual path is generated for each distributed component 108. Since the virtual path to the distributed component 108 includes the version number and is the key to the application cache, when the application switches to a new version the path is changed and the key is broken. This forces the steps 306-312 of FIG. 3 to be executed resulting in the new version of the distributed component 108 to be used by the application as becomes available on the resource server 102.

Referring again to FIG. 1, FIG. 1 shows one example of a general purpose computing device in the form of a computer (e.g., resource server 102, product server A 104, product server 106, client 128, client 130). In one embodiment of the invention, the computer 130 is suitable for use in the other figures illustrated and described herein. Computer has one or more processors or processing units and a system memory.

The computer (e.g., resource server 102, product server A 104, product server 106, client 128, client 130) typically has at least some form of computer readable media. Computer readable media, which include both volatile and nonvolatile media, removable and non-removable media, may be any available medium that may be accessed by the computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer (e.g., resource server 102, product server A 104, product server 106, client 128, client 130) may also include other removable/non-removable, volatile/nonvolatile computer storage media. For example, the computer may include a hard disk drive that reads from or writes to non-removable, nonvolatile magnetic media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The drives or other mass storage devices and their associated computer storage media discussed above provide storage of computer readable instructions, data structures, program modules and other data for the computer (e.g., resource server 102, product server A 104, product server 106, client 128, client 130).

The computer (e.g., resource server 102, product server A 104, product server 106, client 128, client 130) may operate in a networked environment using logical connections to one or more remote computers. The remote computer may be a personal computer, a server, a router, a network PC, a peer device or other common network node, and typically includes many or all of the elements described above relative to computer. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet). In a networked environment, program modules depicted relative to computer (e.g., resource server 102, product server A 104, product server 106, client 128, client 130), or portions thereof, may be stored in a remote memory storage device (not shown). The network connections shown are exemplary and other means of establishing a communications link between the computers may be used.

Generally, the data processors of computer (e.g., resource server 102, product server A 104, product server 106, client 128, client 130) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer (e.g., resource server 102, product server A 104, product server 106, client 128, client 130), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., resource server 102, product server A 104, product server 106, client 128, client 130) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A networked computer system for updating an application, comprising:
    a single resource server including a processor executing computer executable instructions for storing a plurality of distributed application components;
    a plurality of clients, each client requesting a web page including an application component;
    a plurality of product servers, each product server connected to one particular client and to the single resource server, and each product server including a processor executing computer executable instructions for:
        hosting an application including one or more local application components, each requested local application component being associated with a corresponding distributed application component;
        in response to the client request, the application requesting a virtual path for a local application component of the web page requested by the client, wherein the virtual path includes a version number of the local application component and a sub-directory for the local application component, and the virtual path is a unique identifier for the application component in an application's cache;
        using the virtual path to access the local application component from the application cache;
        when the product servers are unable to access the requested local application component with the virtual path, each product server requests an updated version of the distributed application component associated with the requested local application component in from the single resource server;

downloading each corresponding updated distributed application component from the single resource server to each product server;

storing the downloaded updated distributed application component in an application directory of the particular product server and deleting the local distributed application component having an obsolete version stored in the particular product server, wherein the particular product server compiles the downloaded updated distributed application component stored in the application directory and copies the compiled version to the product server's cache when the application requests the local application component;

the compiled updated application component is associated with a new virtual path having a new version number and a new sub-directory, wherein the new virtual path provides the resource server an indication of the most current version of the distributed application component and the deleted obsolete local application component is not associated with the new virtual path;

updating the application by requesting and downloading updated distributed application components at a predetermined synchronization time during a reoccurring window of time, and after a predetermined delay, installing each downloaded application component to the product server.

2. The system of claim 1, wherein the predetermined synchronization time occurs on a regular basis.

3. The system of claim 1, further comprising:
one of the plurality product servers, sending a version request to the single resource server, wherein the single resource server generates a list of the distributed application components and their corresponding distributed version numbers in response to the received request;
the particular product server, receiving from the single resource server the generated list of distributed application components;
the particular product server, downloading at least one distributed application component from the single resource server when the distributed version number does not equal the local version of the corresponding local application component of the particular product server.

4. The system of claim 3, wherein the plurality of product servers each send the version request to the single resource server at a random or pseudo-random time within a predetermined reoccurring window of time.

5. The system of claim 1, wherein the distributed application component includes one or more of the following:
data, a webform, a web control, data, a web page, a precompiled component and a just-in-time (JIT) component.

6. The system of claim 1, wherein the unique identifier of the application component in the application cache associated with the virtual path is broken when the sub-directory path is changed.

7. The system of claim 1, wherein the application associated with the particular product server additionally includes one or more application components which do not correspond to distributed application components of the single resource server.

8. A method for distributing just-in-time (JIT) compilation components stored on a single resource server, comprising:
a plurality of product servers, receiving a request from a plurality of clients for a web page including a JIT component, wherein the requested JIT component is associated with a virtual file path, the virtual path is a unique identifier of the JIT component in an application cache and contains a token and is associated with a version number for the requested JIT component available on the single resource server;
the product servers, determining if a compiled version of the requested JIT component is stored in a cache of the product server, wherein the virtual path is associated with a requested JIT file of the single resource server and associated with a version number of the JIT file;
if the compiled version of the updated JIT component is not stored in the product server cache, then:
the product servers, downloading in a synchronized manner an updated JIT file from the single resource server at a predetermined time period;
the product servers, generating a new version of the JIT component by compiling the downloaded JIT file, the compiled new version of the JIT component having a new virtual path, the new virtual path having a version number of the new version of the JIT component, and the new virtual path associated with the compiled new version of the JIT component;
the product servers, storing the compiled new version of the JIT component in the product server cache, wherein the requested old JIT component stored in the product server cache is deleted when the new version of the JIT component is available on the single resource server;
the product servers, generating a response by executing the stored JIT component in conjunction with the requested web page by the client;
and the product servers, sending the generated response to the clients;
and if an updated compiled version of the JIT component is stored in the product server cache, then:
generating a response by executing the stored JIT component in conjunction with the requested web page, the response associated with the virtual path;
and sending the generated response to the client.

9. The method of claim 8, wherein the requested JIT component stored in the cache is deleted in response to receiving a notification that a new version of the JIT component is available from the single resource server.

10. The method of claim 8, further comprising sending, to the resource server, a version request at a random or pseudo-random time within a predetermined reoccurring window of time to determine if a new version of the requested JIT component is available from the single resource server.

11. The method of claim 8, wherein the JIT component includes one or more of the following: a webform and a web control.

12. A method for updating an application component from a single resource server, comprising:
a plurality of clients, each client requesting a web page including an application component;
a plurality of product servers, each product server connected to one particular client and to the single resource server, and each product server including a processor executing computer executable instructions for:
hosting an application including one or more application components, each requested application component being associated with a corresponding distributed application component;
in response to the client request, the application requesting a virtual path for an application component of the web page requested by the client, wherein the virtual path includes a version number of the application component and a sub-directory for the application component, and the virtual path is a unique identifier for the application component in an application's cache;

using the virtual path to access the application component from the application cache;

when the product servers are unable to access the requested application component with the virtual path, each product server requests an updated version of the distributed application component associated with the requested application component from the single resource server;

downloading each corresponding updated distributed application component from the single resource server to each product server;

storing the downloaded updated distributed application component in an application directory of the particular product server and deleting the application component having an obsolete version stored in the particular product server, wherein the particular product server compiles the downloaded updated distributed application component stored in the application directory and copies the compiled version to the product server's cache when the application requests the application component;

the compiled application component is associated with a new virtual path having a new version number and a new sub-directory, wherein the new virtual path provides the resource server an indication of the most current version of the distributed application component and the deleted obsolete application component is not associated with the new virtual path;

updating the application by requesting and downloading updated distributed application components at a predetermined synchronization time during a reoccurring window of time, and after a predetermined delay, installing each downloaded application component to the product server.

13. The method of claim 12, wherein the application component includes one or more of the following: a webform, a web control, data, a pre-compiled component and a just-in-time (JIT) component.

14. The method of claim 12, further comprising:
periodically sending within a predetermined window of time a request to the single resource server for the most current version of the application component available on the single resource server.

15. The method of claim 14, wherein the sending of the request occurs at a random or pseudo-random time within a predetermined reoccurring window of time.

16. The method of claim 12, wherein the virtual path is a key to the application cache such that the key is broken when the application changes to a new version causing the sub-directory path to change.

* * * * *